Nov. 1, 1966 F. PITTERA 3,282,368
VEHICLE FRONT END STRUCTURE FOR PROTECTING THE POWER
TAKE-OFF AND SUPPORTING A DRIVEN MECHANISM
Filed May 24, 1963

INVENTOR
Frederick Pittera
BY Emery, Whittemore,
Sandoe & Graham
ATTORNEYS.

United States Patent Office 3,282,368
Patented Nov. 1, 1966

3,282,368
VEHICLE FRONT END STRUCTURE FOR PROTECTING THE POWER TAKE-OFF AND SUPPORTING A DRIVEN MECHANISM
Frederick Pittera, 200 East End Ave., New York, N.Y.
Filed May 24, 1963, Ser. No. 283,081
3 Claims. (Cl. 180—53)

This invention relates to automotive vehicles, such as trucks and tractors; and the invention relates more particularly to the combination, with such a vehicle, of a frame that is hinged to the vehicle and that is movable between different positions for selective use as a guard or as a support, the latter being intended for auxiliary equipment.

It is an object of the invention to provide a hinged frame on an automotive vehicle that has a power take-off and to locate the frame so that it can be moved down to position to support a mechanical device that is to be driven from the power take-off. Another object is to locate the frame so that when not used as a support for such a device, the frame is movable into an upwardly extending position where it is out of the way and where it serves as a guard for preventing persons standing near the vehicle from bumping against the power take-off. In the preferred construction, the frame is a grille and is used to protect the headlights as well as the power take-off.

Another object of the invention is to provide an automotive vehicle, having a power take-off, with a frame that supports auxiliary equipment having driving means in position to be operated from the power take-off, but with the auxiliary means detachably connected to the frame for removal when not in use, the frame being connected with the vehicle by hinge means on which the frame swings into an upwardly extending position where it serves as a guard when not in use as a support.

Other objects, features and advantages of the invention will appear or be pointed out as the description proceeds.

In the drawing, forming a part hereof, in which like reference characters indicate corresponding parts in all the views.

Figure 1:
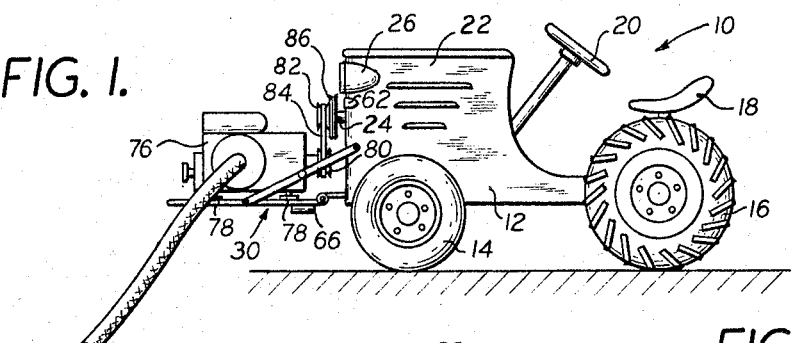
FIGURE 1 is a side elevation showing a tractor equipped with a frame and having auxiliary equipment located on the frame and driven from a power take-off of the tractor in accordance with this invention.

FIGURE 1 shows a tractor 10 which has a body 12 with front wheels 14 and rear wheels 16. The tractor has a seat 18 and steering wheel 20. There is a hood 22 at the front end of the tractor and the engine is located under the hood 22. A power take-off 24 extends from the engine through the front end of the tractor body 12. There are headlights 26 attached to the tractor at opposite sides of the hood 22. Control mechanism for driving the tractor is not illustrated. Such control apparatus is conventional and no description of it is necessary for a complete understanding of this invention.

There is a frame 30 attached to the front end of the tractor body 12 by hinge means 32. This hinge means includes a transversely extending tubular element 34 which is attached to the body 12 by connectors 36 welded at one end to frame members 38 of the tractor body.

The frame 30 includes two side pieces 40 which are supported from the tubular element 34. These side pieces 40 are supported by the tubular element 34 and are movable angularly on the tubular element as a bearing. Side pieces 40 are held against axial movement along the tubular element 34 by collars 42 detachably secured to the tubular element 34.

Figure 2:
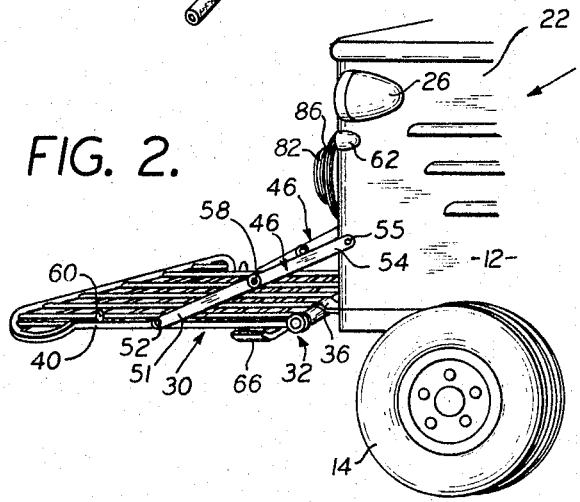
FIGURE 2 is an enlarged, isometric view showing the front end of the tractor of FIGURE 1 with the auxiliary equipment removed from the frame.

There are retaining means 46 at both sides of the frame 30. Each of the retaining means 46 includes a link 51 attached to a side piece 40 by a pivot connection 52. Each of the retaining means include also another link 54 attached to the body of the tractor by pivot connection 55. The links 51 and 54 are connected together by a pivot connection 58. The links 51 and 54 are of such length and are connected at such a location on the body of the tractor that they hold the frame 30 in a substantially horizontal position when the frame 30 is swung downwardly into its forwardly extending position shown in FIGURES 1 and 2.

Figure 3:
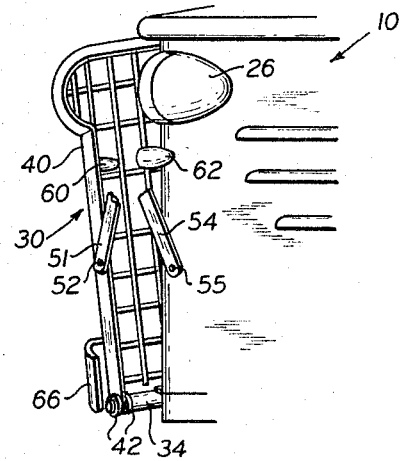
FIGURE 3 is a fragmentary, isometric view, on an enlarged scale, showing the releasable locking means for holding the frame in an elevated position when not in use as a support.
Figure 4:
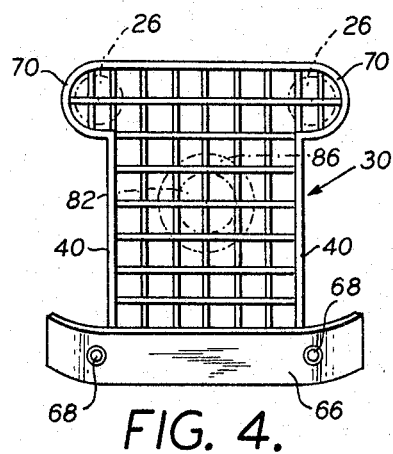
FIGURE 4 is a front view of the frame, shown in the other figures, when the frame is in its upwardly extending position.
Figure 5:
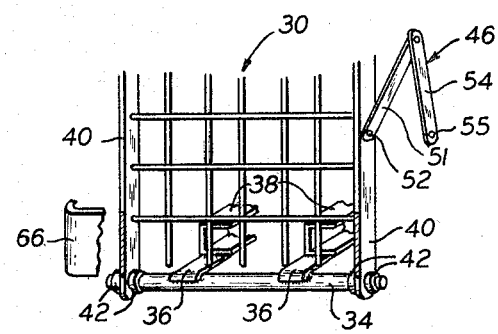
FIGURE 5 is a fragmentary view, partly broken away, showing the way in which the frame is attached to the tractor.

When the frame 30 is to be swung upwardly, the retaining means 46 are moved upwardly at the pivot connections 58 so as to shift the links 51 and 54 into the positions as shown in FIGURES 3 and 5. As the frame 30 moves into its upwardly extending position, a latch element 60 extending from each side piece 40 moves into a socket 62 having a spring snap which grips the latch element 60 to hold the frame 30 in its upwardly extending, and substantially vertical position. FIGURE 3 shows the frame 30 just before it reaches its upwardly extending position and just before the latch element 60 enters the socket 62.

The frame 30 is preferably made as a grille with a bumper 66 secured to its lower end by brackets 68 which attach to the side pieces 40; and the upper part of the frame 30 extends outwardly on both sides so as to provide proctecting portions 70 in front of the headlights 26 of the tractor or other automotive vehicle.

When the frame 30 is in its forwardly extending position, it can be used for carrying a load; but it is intended primarily for supporting auxiliary equipment such as a pump 76 (FIGURE 1) and this pump 76 is merely representative of a mechanical device which is to be driven from the power take-off 24 of the tractor. The pump 76 has brackets 78 by which it is detachably connected to the frame 30 in position to locate a pulley 80 of the pump 76 in alignment with a pulley 82 secured to the shaft of the power take-off 24. A belt 84 runs on the pulleys 80 and 82 and this belt together with the pulleys, constitutes a motion-transmitting connection between the power take-off 24 and the pump 76. In the construction shown in FIGURE 1 there is another pulley 86 rigidly connected with the pulley 82; and the brackets 78 can be adjusted so as to move the pump 76 into position to align the pulley 80 with the larger pulley 86 so that the power take-off 24 will drive the pump 76 at higher speed.

The brackets 78 are preferably simple clamping means with plates above and below the grille work of the frame 30 and with bolts extending through from one side of the grille work to the other so that the brackets 78 can be shifted to change the location of the pump 76 when necessary, to align with the different pulleys 82 and 86.

Other mechanical devices such as a generator or saw can be placed on the frame 30 in place of the pump 76 and the mechanical device carried by the frame 30 is thoroughly portable by moving the tractor from place to place.

When the frame 30 is in its upwardly extending position, it extends across the front of the power take-off including the pulleys 82 and 86, and serves as a guard to prevent a person standing near the tractor from bumping against or leaning against the pulleys 82 and 86 which may be rotating. When the frame 30 is in its forwardly extending position, and particularly when there is a mechanical device on the frame 30, it is not possible for anyone to walk close to the power take-off 24 or to bump against it accidentally while standing near the tractor.

From the foregoing description it will be apparent that the frame 30, connected to the tractor by the hinge means at the lower end of the tractor body, provides a convenient support for auxiliary equipment which is operated from a power take-off when the frame is in its forwardly extending position; and provides an effective guard for ensuring safety of persons who are standing near the tractor when the frame 30 is in its upwardly extending position. For small tractors, such as illustrated in the drawing, the location of the frame 30 at the front of the tractor is most desirable; but where the tractor has the power take-off on the side instead of at the front, the frame can be hinged to one side of the tractor, below the power take-off, to serve as a support for auxiliary equipment and as a guard for the power take-off as already described. The side frame, however, cannot also function in the same manner as a headlight guard.

The preferred embodiment of the invention has been illustrated and described, but changes and modifications can be made and some features can be used in different combinations without departing from the invention, as defined in the claims.

What is claimed is:

1. The combination with an automotive vehicle having a power take-off, of a frame, hinge means connecting the frame with the vehicle and on which the frame is angularly movable between an upwardly-extending position and a substantially horizontally-extending position, the frame in its upwardly-extending position covering the power take-off as a safety guard to prevent persons adjacent to the vehicle from bumping against the power take-off, and the frame in its horizontally-extending position being at a location to support a mechanical device in position to be driven from the power take-off, a pulley on the end of the power take-off, and a mechanical device on the frame with a pulley in substantial transverse alignment with the pulley of the power take-off and motion-transmitting connections by which the pulley of the mechanical device is driven from the pulley of the power take-off.

2. The combination described in claim 1 characterized by openings through the frame, and fastening means extending through the openings and holding the mechanical device in a fixed position on the frame, the fastening means being detachable for removal of the device before the frame is swung into its upwardly-extending position.

3. The combination described in claim 1 characterized by the frame being connected to the front of the vehicle, and the mechanical device being a pump with a shaft extending in a direction parallel to the axis of the power take-off and spaced below the power take-off, the motion-transmitting means being an endless belt.

References Cited by the Examiner

UNITED STATES PATENTS

| | | | |
|---|---|---|---|
| 763,718 | 6/1904 | Byington | 296—57 |
| 1,265,086 | 5/1918 | Jacobs | 180—53 |
| 1,453,618 | 5/1923 | Bovender | 180—53 |
| 1,648,128 | 11/1927 | Jaeger | 180—53 |
| 1,682,313 | 8/1928 | Turner | 180—53 X |
| 1,884,228 | 10/1932 | Raskin | 293—60 |
| 2,431,495 | 11/1947 | Mosser | 293—60 X |
| 2,468,809 | 5/1949 | Brock et al. | 180—69 |
| 2,576,316 | 11/1951 | Toth | 180—68 |
| 2,711,060 | 6/1955 | Dudding | 180—53 |
| 3,002,579 | 10/1961 | Mihal | 180—53 |

FOREIGN PATENTS

| | | |
|---|---|---|
| 104,247 | 3/1917 | Great Britain. |
| 494,213 | 7/1953 | Canada. |

A. HARRY LEVY, *Primary Examiner.*